D. F. OLIVER.
SHOCK ABSORBER.
APPLICATION FILED JUNE 14, 1915. RENEWED AUG. 20, 1917.

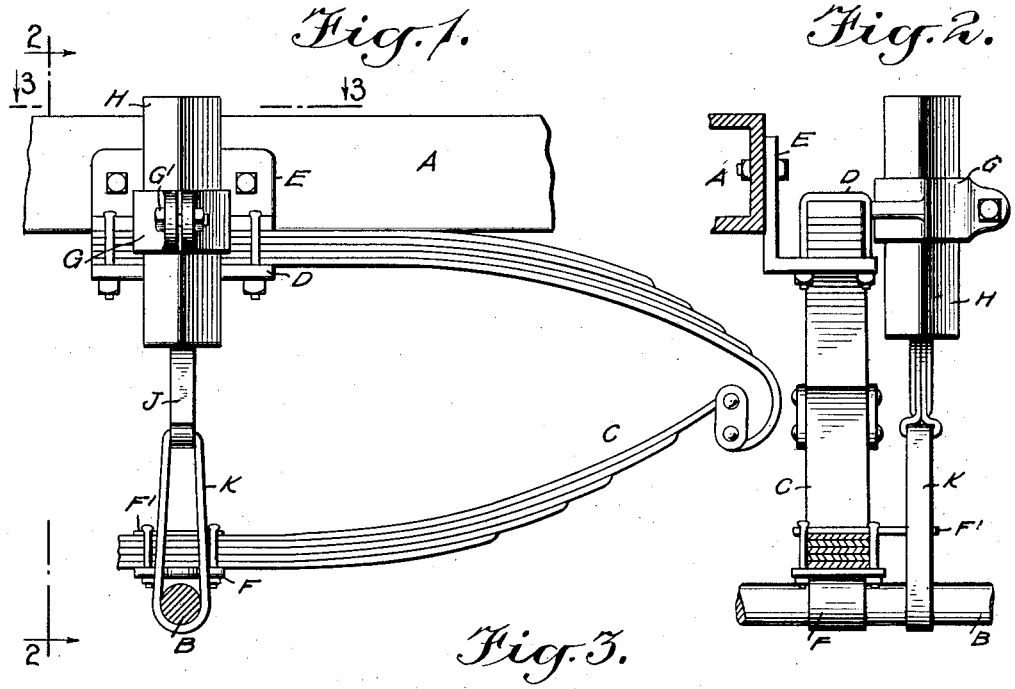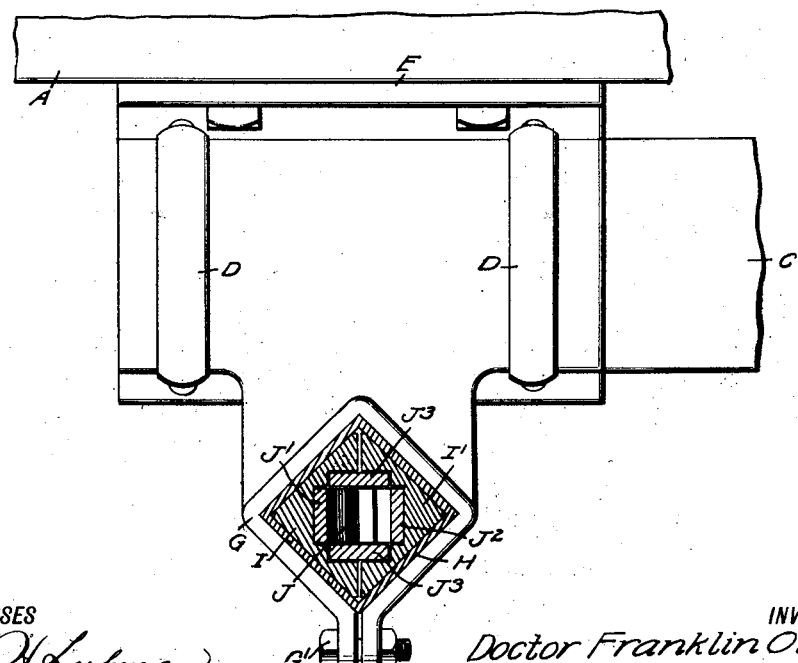

1,260,019.

Patented Mar. 19, 1918.
2 SHEETS—SHEET 2.

WITNESSES:

INVENTOR
Doctor Franklin Oliver.

BY
ATTORNEY

UNITED STATES PATENT OFFICE.

DOCTOR FRANKLIN OLIVER, OF OAKLAND, CALIFORNIA; LILLIE F. OLIVER EXECUTRIX OF SAID DOCTOR FRANKLIN OLIVER, DECEASED.

SHOCK-ABSORBER.

1,260,019.  Specification of Letters Patent.  Patented Mar. 19, 1918.

Application filed June 14, 1915, Serial No. 34,031. Renewed August 20, 1917. Serial No. 187,253.

*To all whom it may concern:*

Be it known that I, DOCTOR FRANKLIN OLIVER, a citizen of the United States, and a resident of Oakland, in the county of Alameda and State of California, have invented a new and Improved Shock-Absorber, of which the following is a full, clear, and exact description.

The object of the invention is to provide a new and improved shock absorber for use on automobiles and other vehicles and devices and arranged to take up shocks incident to a sudden downward movement of the chassis and also during a sudden rebounding movement.

In order to accomplish the desired result, use is made of a friction brake having a fixed member movable bodily with the vehicle body, and a slidable member normally in light frictional contact with the said fixed member, and an actuating member carrying springs engaging the said slidable member to forcibly move the slidable member in frictional engagement with the fixed member to carry the same along on a sudden downward movement of the vehicle body, the said actuating member returning automatically to normal position as soon as the force of the sudden movement is spent. Use is also made of flexible means connecting the actuating member with the axle of the vehicle for checking the rebound of the vehicle body.

A practical embodiment of the invention is represented in the accompanying drawings forming a part of this specification, in which similar characters of reference indicate corresponding parts in all the views.

Figure 1 is a side elevation of the shock absorber as applied;

Fig. 2 is a cross section of the same on the line 2—2 of Fig. 1;

Fig. 3 is an enlarged sectional plan view of the same on the line 3—3 of Fig. 1;

Figure 4:
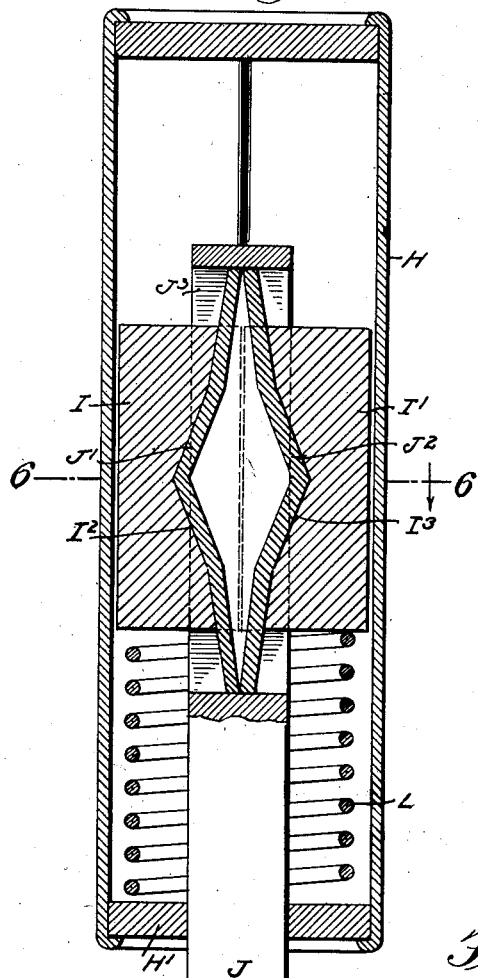
Fig. 4 is an enlarged sectional side elevation of the shock absorber.
Figure 5:
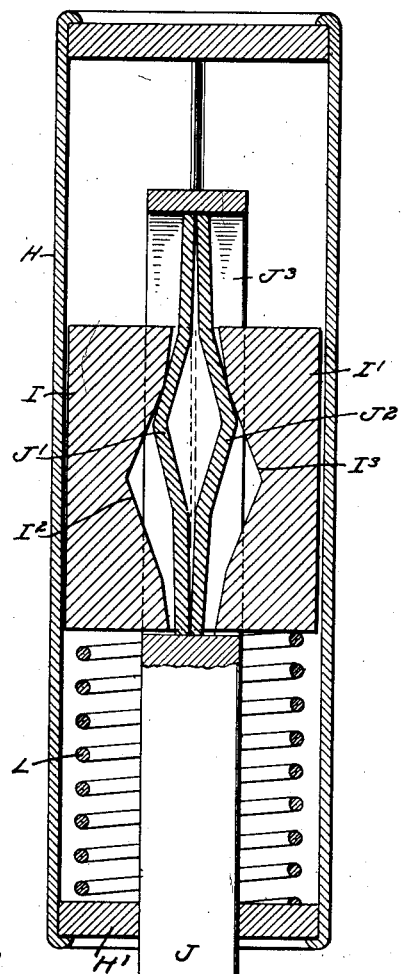
Fig. 5 is a similar view of the same with the parts in position on a sudden downward movement of the vehicle body.
Figure 6:
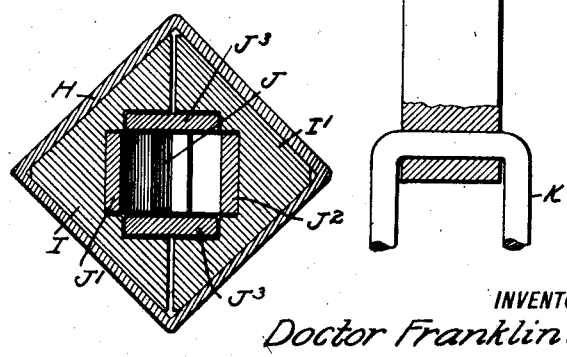
Fig. 6 is a cross section of the same on the line 6—6 of Fig. 4.

The chassis A and the axle B of the vehicle are connected with each other in the usual manner by springs C, each fastened by clips D to a bracket E secured to the chassis A and by clips F to the axle B, as plainly indicated in Figs. 1 and 2. Each clip D carries a split bearing G in which is held a vertically adjustable guideway H, preferably in the form of a casing of diamond shape in plane, as plainly indicated in Fig. 3. The free ends of the split bearing G are connected with each other by a bolt G' which when loosened allows up and down adjustment of the guideway H in the bearing G. After the desired adjustment of the guideway H has been made the nut of the bolt is screwed up to securely clamp the guideway H in place. Within the guideway H is mounted to slide a friction member in the form of two shoes I and I' made V shape at their outer faces to fit the corresponding inner faces of the guideway H, as plainly shown in Figs. 3 and 6. The opposite faces of the shoes I and I' are provided with V-shaped seats $I^2$, $I^3$ into which fit correspondingly shaped resilient members J' and $J^2$ of a plunger J extending downward through the bottom H' of the guideway H to connect at its lower end by a leather or other flexible strap K with an axle stop which may be the axle itself or any part fixed thereon. As shown, the bottom of the plunger J is in the path of and spaced from an axle stop in the form of an extension of the top plate F' of the clip F. The resilient members J', $J^2$ are preferably in the form of flat springs held at their upper and lower ends in the top and bottom of a loop $J^3$ formed on the upper end of the plunger J, as will be readily understood by reference to Figs. 4, 5 and 6. When the parts are in normal position, as shown in Fig. 4, the top and bottom of the shoes I and I' are distances from the top and bottom of the loop $J^3$ so that the movement of the resilient members J', $J^2$ relative to the shoes I, I' is limited, and when the extreme position in an upward direction is reached and the plunger J moves still farther upward then the bottom of the loop $J^3$ contacts with the bottoms of the shoes I, I' and carries the same along in an upward direction. In a like manner when the resilient members J', $J^2$ reach an extreme lowermost position between the shoes I, I' during the descent of the plunger J and the latter moves still farther downward then the top of the loop J³ contacts with the tops of the shoes I, I' and carries the latter along in a downward direction.

Normally the resilient members J' and J² press the shoes I and I' in light frictional contact with the inner surface of the guideway H. When the chassis A and the axle B move slowly toward or from each other and the plunger J strikes the fixed part F' and moves upward then the shoes I and I' are carried along by the plunger without acting as a shock absorber. In case of a sudden downward movement of the vehicle body, the sudden contact of the plunger J with the fixed part F' causes the plunger to move suddenly upward and its members J' and J² are driven out of the seats I², I³ especially as the inertia of the shoes I, I' holds the latter against upward movement. The resilient members J', J² in assuming the position shown in Fig. 5, force the shoes I, I' into strong frictional contact with the guideway H and then move the same along in the guideway until the downward movement of the vehicle body ceases. During the simultaneous movement of the plunger and shoes the shock of the vehicle body is absorbed. As soon as the force of the downward movement of the vehicle body is spent, the resilient members J', J² return by their resiliency to the seats I², I³, thus allowing the shoes I, I' to move out of forcible contact with the guideway H. During the return movement of the vehicle body the strap K pulls the plunger J and with it the shoes I, I' downward to the normal position shown in Fig. 4.

In case of a sudden rebound the strap K pulls the plunger J suddenly downward so that the resilient members J', J² leave their seats in a downward direction and press the shoes in firm contact with the guideway H, and then the plunger and shoes move together downwardly to absorb the shock incident to the rebound. After the force of the latter, the spring members J', J² return to their seats to release the shoes from forcible contact with the guideway H.

A light spring L is arranged in the lower end of the guideway H and bears on the under side of the shoes to return the latter in an upward direction to normal position after being released, as above explained. In normal position, the shoes I, I' are in an approximately half-way position between the bottom and top of the guideway H.

The shock absorber shown and described is simple and durable in construction and can be readily attached to the vehicle without practically changing any of the parts thereof.

Having thus described my invention, I claim as new and desire to secure by Letters Patent:

1. A shock absorber for vehicles, comprising a brake having a member fixed to the vehicle body and a braking member normally in light frictional contact with the fixed member, and resilient actuating means having inclined faces adapted to move the said braking member into forcible frictional contact with the fixed member and moving it along the same during a sudden movement of the vehicle body.

2. A shock absorber for vehicles, comprising a brake having a member fixed to the vehicle body and a braking member normally in light frictional contact with the fixed member, resilient actuating means having inclined faces adapted to move the said braking member into forcible frictional contact with the fixed member and moving it along the same during a sudden movement of the vehicle body, and flexible means connecting the said actuating means with the axle to take up the shock during a rebound.

3. A shock absorber for vehicles, comprising a brake having a member fixed to the vehicle body and a braking member normally in light frictional contact with the fixed member, a stop member carried by the axle and actuating means adapted to move the said braking member into forcible frictional contact with the fixed member and moving it along the same during a sudden movement of the vehicle body, the said actuating means being normally spaced from said stop member and adapted to move in contact with the same on a downward movement of the vehicle body.

4. A shock absorber, comprising a guideway, friction shoes slidably mounted in the guideway and in light frictional contact therewith, and a plunger having resilient members in frictional engagement with the said shoes to move the latter along in the guideway on a slow movement of the guideway relatively to the plunger, the said resilient members moving the shoes in forcible contact with the guideway on a sudden movement of the guideway and plunger relatively one to the other.

5. A shock absorber, comprising a guideway adapted to be attached to the vehicle chassis, a pair of shoes slidable in the said guideway, and a plunger flexibly connected with the axle and adapted to engage the axle on a movement of the guideway and plunger toward or from each other, the said plunger being provided with resilient members slidably engaging the said shoes and normally pressing the same with a light force in frictional engagement with the said guideway, the said shoes and resilient members having inclined contacting faces to slide the shoes in the guideway on a slow movement of the chassis and axle toward or from each other and to cause the plunger to slide on the shoes on a sudden movement of the chassis and axle toward each other to move the said shoes in forcible frictional contact with the guideway and to then carry the shoes along.

6. A shock absorber, comprising a guideway adapted to be attached to the vehicle chassis, a pair of shoes slidable in the said guideway, a plunger connected with the axle and provided with resilient members slidably engaging the said shoes and pressing the same with a light force in frictional engagement with the said guideway, the said shoes and resilient members having inclined contacting faces to slide the shoes in the guideway on a slow movement of the chassis and axle toward or from each other and to cause the plunger to slide on the shoes on a sudden movement of the chassis and axle toward each other to move the said inclined faces of the plunger lengthwise on the inclined faces of the shoes to press the latter forcibly in frictional contact with the guideway and carrying the shoes along, and means for limiting the relative movements of the parts.

7. A shock absorber, comprising a guideway adapted to be attached to the vehicle chassis, a pair of shoes slidable in the said guideway, a plunger connected with the axle and provided with resilient members slidably engaging the said shoes and pressing the same with a light force in frictional engagement with the said guideway, the said shoes and resilient members having inclined contacting faces to slide the shoes in the guideway on a slow movement of the chassis and axle toward or from each other and to cause the plunger to slide on the shoes on a sudden movement of the chassis and axle toward each other to move the said inclined faces of the plunger lengthwise on the inclined faces of the shoes to press the latter forcibly in frictional contact with the guideway and carry the shoes along, and a spring on the guideway engaging the said shoes to return the latter to normal position in the guideway.

8. A shock absorber provided with a guideway, a pair of shoes in the said guideway and having inclined seats on their opposite faces and a plunger having resilient angular arms engaging the said shoe seats.

9. A shock absorber, comprising a guideway, friction shoes slidably mounted in the guideway and in light frictional contact therewith, and a plunger having resilient members in frictional engagement with the said shoes to move the latter along in the guideway on a slow movement of the guideway relatively to the plunger, the said resilient members moving the shoes in forcible contact with the guideway on a sudden movement of the guideway and plunger relatively one to the other, the said plunger contacting with the said shoes and moving the same bodily along on the resilient members reaching their extreme positions on the shoes and on further movement of the plunger.

10. A shock absorber, comprising a guideway, friction shoes slidably mounted in the said guideway and in light frictional contact therewith, the shoes having angular seats at their opposite faces, a plunger having a loop extending between the said shoes and having its top and bottom normally spaced from the top and bottom of the said shoes, and resilient members in the form of flat springs held in the said loops and having angular arms engaging the said seats.

In testimony whereof I have signed my name to this specification in the presence of two subscribing witnesses.

DOCTOR FRANKLIN OLIVER.

Witnesses:
ANNETTE MARKHAM,
MORTON KANN.